United States Patent [19]
Weiler et al.

[11] Patent Number: 5,701,978
[45] Date of Patent: Dec. 30, 1997

[54] SET OF BRAKE PADS FOR FLOATING-CALIPER DISC BRAKE

[75] Inventors: Rolf Weiler, Eppstein; Wolfgang Schiel, Frankfurt am Main, both of Germany

[73] Assignee: ITT Automotive Europe GmbH, Frankfurt, Germany

[21] Appl. No.: 656,278

[22] PCT Filed: Nov. 18, 1994

[86] PCT No.: PCT/EP94/03828

§ 371 Date: Nov. 18, 1996

§ 102(e) Date: Nov. 18, 1996

[87] PCT Pub. No.: WO95/14868

PCT Pub. Date: Jun. 1, 1995

[30] Foreign Application Priority Data

Nov. 27, 1993 [DE] Germany .................... 43 40 454.5

[51] Int. Cl.$^6$ ............ F16D 55/00; F16D 65/40; F16D 65/02; F16D 55/224; F16D 65/092
[52] U.S. Cl. ............ 188/73.32; 188/73.1; 188/73.38; 188/250 B; 188/250 G; 188/234; 188/370
[58] Field of Search ............ 188/73.38, 73.37, 188/250 E, 73.1, 72.4, 73.31, 250 B, 250 G, 234, 73.46, 106 P, 72.5, 71.1, 73.32, 73.33, 73.34, 73.35, 73.36, 264 G, 370

[56] References Cited

U.S. PATENT DOCUMENTS

| | | | |
|---|---|---|---|
| 3,166,157 | 1/1965 | Burnett | 188/71.1 |
| 4,344,511 | 8/1982 | Stoka et al. | 188/73.45 |
| 4,428,461 | 1/1984 | Warwick | 188/72.4 |
| 4,533,025 | 8/1985 | Carre | 188/73.1 |
| 4,600,090 | 7/1986 | Feldmann et al. | 188/218 XL |
| 4,609,077 | 9/1986 | Nakatsuhara | 188/73.38 |
| 4,705,146 | 11/1987 | Tarter | 188/73.1 |
| 4,809,825 | 3/1989 | Oltmanns, Jr. et al. | 188/73.38 |
| 4,905,796 | 3/1990 | Schonenberger et al. | 188/73.38 |
| 5,113,978 | 5/1992 | Weiler et al. | 188/73.31 |
| 5,343,985 | 9/1994 | Thiel et al. | 188/72.5 |
| 5,363,943 | 11/1994 | Iwashita et al. | 188/106 P |
| 5,494,140 | 2/1996 | Weiler et al. | 188/73.37 |

FOREIGN PATENT DOCUMENTS

| | | |
|---|---|---|
| 0150052 | 7/1985 | European Pat. Off. . |
| 0347523 | 12/1989 | European Pat. Off. . |
| 2454560 | 11/1980 | France . |
| 1803246 | 10/1969 | Germany . |
| 3815733 | 11/1989 | Germany . |
| 4120631 | 12/1992 | Germany . |
| 2147376 | 5/1985 | United Kingdom . |

OTHER PUBLICATIONS

Search Report of the German Patent Office for Application No. P4340454.5.

*Primary Examiner*—Douglas C. Butler
*Attorney, Agent, or Firm*—J. Gordon Lewis; Thomas N. Twomey

[57] ABSTRACT

A set of brake pads for a floating-caliper disc brake including a first brake pad with a first retaining spring for clamping engagement on a brake piston and a second brake pad with a second retaining spring for clamping engagement on an axially external leg of the floating caliper. The first retaining spring has two resilient tongues which are locked in a bore of the hollow brake piston, and the second retaining spring has identical resilient tongues which are locked in a recess of the external housing leg. According to the present invention, the distances between the respectively opposed resilient tongues are different in conformity with the different widths of the bore and the recess, respectively. The provision according to the present invention renders it impossible to attach the first brake pad to the external housing leg and the second brake pad to the brake piston. This safeguard against a mix-up is especially advantageous when the first friction lining of the first brake pad differs in shape from the second friction lining of the second brake pad so that the two brake pads must under no circumstances get mixed up.

10 Claims, 2 Drawing Sheets

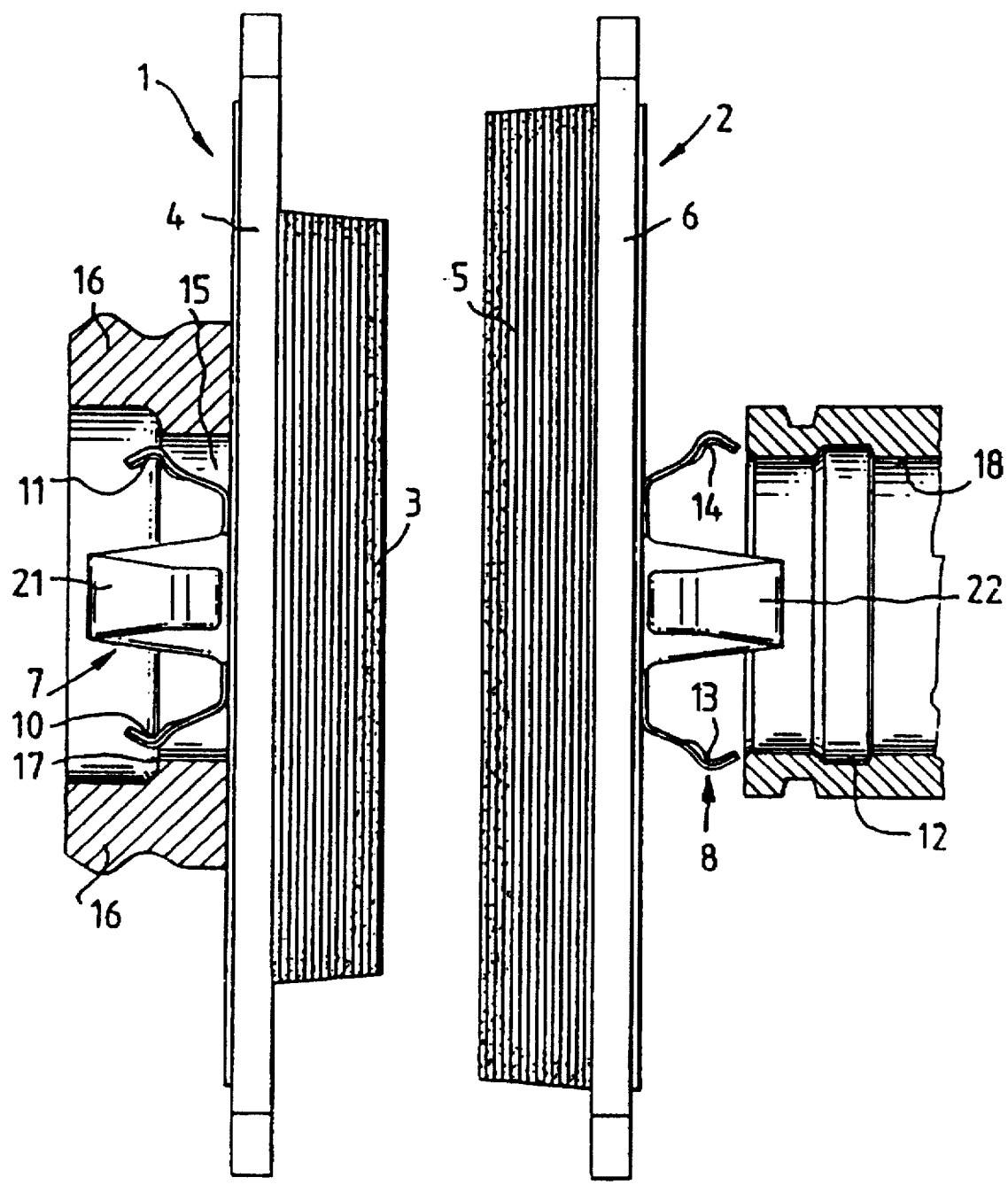

SET OF BRAKE PADS FOR FLOATING-CALIPER DISC BRAKE

TECHNICAL FIELD

The present invention relates to brakes and more particularly relates to a set of brake pads for a floating-caliper disc brake.

BACKGROUND OF THE INVENTION

A floating-caliper disc brake including a generic set of brake pads is disclosed in German patent application No. DE 38 15 733. The known set of brake pads comprises a first brake pad with a first retaining spring made of resilient sheet metal for clamping engagement on the brake piston and a second brake pad with a second retaining spring for clamping engagement on an external housing leg of the floating caliper. The first and second retaining springs have an identical design. Also, the bore in the brake piston provided for engagement of the first retaining spring has the same diameter as the recess in the external housing leg, which recess has the shape of part of a circle and is provided for engagement of the second retaining spring.

Preferably, the two brake pads have an identical design in the prior art disc brake, and interchanging the two brake pads will not cause any problems. If, however, for functional reasons, a different form of friction lining is provided for use on the first brake pad than for the second brake pad, the two brake pads must not be interchanged during the assembly. If, on the other hand, the backplates of the two brake pads do not differ from each other and, further, the guide surfaces of the disc brake for support of the backplates on the axially inner side and the axially outer side are equally arranged, the first brake pad intended for use on the axially inner side would easily allow being mounted on the axially outer side, and vice-versa. The result of such an occurrence would be functional deficiencies of the disc brake. An object of the present invention is to provide a set of brake pads made up of different brake pads for a floating-caliper disc brake, permitting a first brake pad to be fitted only on the axially inner side and a second brake pad to be fitted only on the axially outer side of the floating caliper.

Principally, the solution involves simply making the retaining spring, which is already provided for attachment of the brake pad, a distinctive feature by configuring it differently for the first brake pad and for the second brake pad. When the set of brake pads is mounted correctly, each spring is retained in its associated opening in the brake piston or the external housing leg. When the brake pads are interchanged, however, the large retaining spring does not permit insertion in the small opening, and the small retaining spring does not permit clamping engagement in the large opening. Wrong assembly with mixed up sets of brake pads is, thus, impossible with the set of brake pads according to the present invention. Another advantage is that the present invention does not cause higher manufacturing costs for the set of brake pads or the associated disc brake.

In a preferred embodiment, the dimensions of the first retaining spring are smaller than those of the second retaining spring. A further preferred embodiment permits clamping engagement of the two opposed resilient tongues. The force components directed in parallel to the brake disc will compensate each other, and only a force component directed in parallel to the axis of the brake piston remains for application of the brake pad on the brake piston.

A third resilient tongue is arranged vertically to the other two resilient tongues and has no partner so that it exerts a force that is generally directed to the axis of the brake piston to apply the brake pad to the guide surfaces of the disc brake and prevent rattling. It is preferred that the portion of the third resilient tongue, that is used for application, generally has the same distance to the axis of the brake piston as the other two resilient tongues.

In a preferred embodiment, the two retaining springs have an identical design, with the exception of the distances between the resilient tongues. Preferably, the dimensions of the two retaining springs differ by 10% approximately. This provides a great degree of distinction, without causing functional problems for the retaining springs. The present invention is especially favorable when the brake pads have identical backplates which may easily be interchanged during the assembly. On the other hand, the friction linings are different in shape and must not be mixed up under any circumstances.

The present invention for use on a floating-caliper disc brake intended for using a set of brake pads and having a bore in the brake piston that is adapted to the first retaining spring and a recess in the external housing leg that is adapted to the second retaining spring. Advantages are achieved for the manufacture of the floating caliper when the bore in the brake piston is narrower than the recess in the external housing leg because the cylindrical bore in the floating caliper provided for the brake piston is machined by a tool which reaches through the recess in the external housing leg. Because the drilling tool has a round cross-section, preferable to configure the recess in the external housing leg as part of a circle. The three resilient tongues of the first retaining spring are correspondingly arranged for engagement in the round bore in the brake piston. Preferably the second retaining spring intended for engagement into the recess, that is shaped like part of a circle, may principally be designed exactly like the first retaining spring, with the exception of the different distances of the resilient tongues from the axis of the brake piston. It is favorable that the diameters of the recess and the bore differ by roughly 10% in conformity with the dimensions of the retaining springs.

BRIEF DESCRIPTION OF THE DRAWINGS

FIG. 2 is a situation corresponding to FIG. 1, however, with interchanged brake pads.

DETAILED DESCRIPTION OF THE PREFERRED EMBODIMENTS

Figure 1:
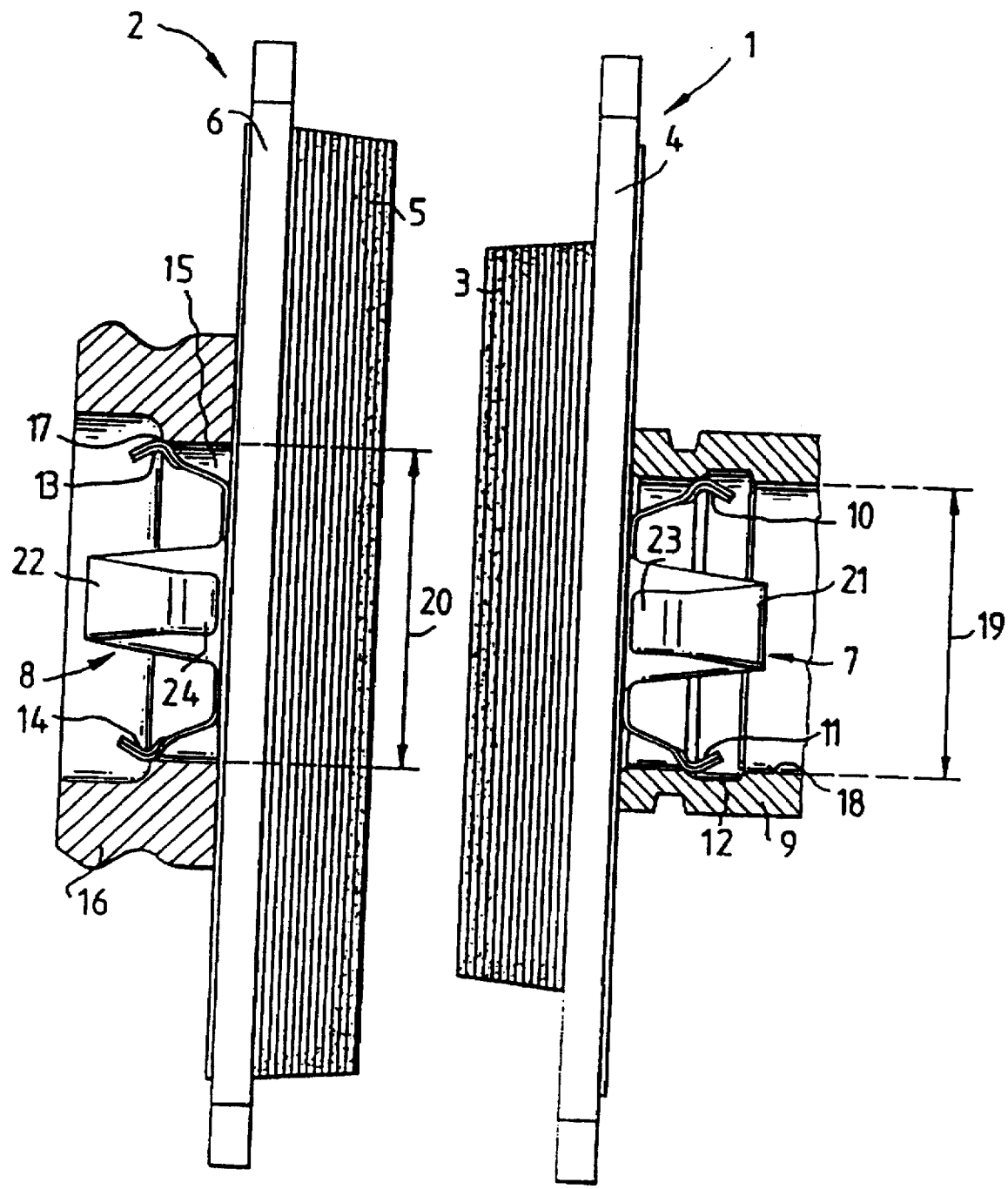
FIG. 1 is a side view of a brake pad, according to the present invention, in the correct mounting situation including a brake piston on the axially inner side, shown in a partial sectional view, and an external housing leg, shown in a partial sectional view.

The set of brake pads, according to the present invention, illustrated in the Figures and provided for use in a floating-caliper disc brake comprises a first brake pad 1 and a second brake pad 2. The first brake pad 1 includes a first friction lining 3 which is attached to the front side of a backplate 4. The second brake pad 2 includes a second friction lining 5 which is attached to a backplate 6. While the two backplates 4, 6 have an identical design, the first friction lining 3 has a smaller surface than the second friction lining 5. Further, the first brake pad 1 has a first retaining spring 7 which is attached to the rear side of the backplate 4. The second brake pad 2 has a second retaining spring 8 which is attached to the backplate 6.

The retaining springs 7, 8 serve to mount the brake pads 1, 2 on the floating caliper of the disc brake. The floating caliper has a hollow brake piston 9 on its axially inner side. The retaining spring 7 of the first brake pad 1 is intended for engagement in the hollow brake piston 9 in order to mount the brake pad 1 on the floating caliper and retain it in constant abutment with the brake piston 9. For this purpose, the first retaining spring 7 has two opposed resilient tongues 10, 11 which are engaged in an annular groove 12 in the interior of the hollow brake piston 9. The second retaining spring 8 also has two opposed resilient tongues 13, 14 for clamping engagement in a recess 15 of an external housing leg 16. Recess 15 has a step 17, and the resilient tongues 13, 14 are locked on the step. The hollow interior of the brake piston 9 takes the shape of a bore 18 having a circular cross-section and a diameter 19. The recess 15 of the external housing leg 16 is partly semicircular with a diameter 20. Diameter 19 is slightly smaller than diameter 20. According to the present invention, the distance between the two resilient tongues 10, 11 of the first retaining spring 7 is conformed to the diameter 19, and the distance between the two resilient tongues 13, 14 of the second retaining spring 8 is conformed to the diameter 20. That is to say, the resilient tongues 10, 11 are closer to each other than the resilient tongues 13, 14 which are more remote from each other. The shape of the two retaining springs 7, 8 is identical, with the exception of the distances between the resilient tongues 10 and 11, and 13 and 14, respectively. Exactly as the diameters 19 and 20, the distances of the resilient tongues differ in their size by roughly 10%.

In addition to the resilient tongues 10, 11 and 13, 14, respectively, which are arranged at an angle of 180°, each of the retaining springs 7, 8 has a third resilient tongue 21, 22 which is arranged at an angle of 90° in relation to the other springs.

Initially, the third resilient tongue 21, 22 extends away from the backplate 4, 6 of the brake pad 1, 2 and, after a deflection, reaches towards the backplate 4, 6 again. The end of the third resilient tongue 21, 22, proximate the backplate 4, 6, abuts on the wall of the bore 18 in the brake piston 9 or the wall of the recess 15 in the external housing leg 16 and retains the respective brake pad 1, 2 in an anti-rattle manner in its guides in the disc brake (not shown). With respect to the circular cross-section of the bore 18 or the semicircular cross-section of the recess 15, the portion 23 or 24 of the third resilient tongue 21, 22, which is intended for abutment, has generally the same distance to the axis of the brake piston as the other two resilient tongues 10, 11 or 13, 14, respectively.

The situation shown in FIG. 2 occurs when the first brake pad 1 and the second brake pad 2 are interchanged. In this event, the first retaining spring 7 will be positioned in the recess 15 of the external housing leg 16. However, as the distance between the resilient tongues 10, 11 is considerably smaller than the diameter of the recess 15, the first retaining spring 7 cannot become locked in the recess 15 so that attachment of the first brake pad 1 is impossible. Matters are vice-versa with the second brake pad 2. The distance between the resilient tongues 13, 14 is considerably larger than the internal diameter of the bore 18 so that the second spring 8 cannot be inserted into the bore 18 of the brake piston 9. Therefore, it is impossible to mount the second brake pad 2 on the wrong axial side of the floating caliper.

We claim:

1. A set of brake pads for a floating-caliper disc brake, comprising:

a first brake pad used for abutment on a brake piston on the axially inner side of a floating caliper, the first brake pad including a backplate which carries a first friction lining and has attached to its rear side a first retaining spring for clamping engagement of the first brake pad on the brake piston, and a second brake pad used for abutment on an external housing leg of the floating caliper, the second brake pad including a backplate which carries a second friction lining and has attached to its rear side a second retaining spring for clamping engagement of the second brake pad on a recess of the external housing leg, wherein the first and second retaining springs respectively include opposed resilient tongues, wherein said first friction lining and said second friction lining are different in shape, and wherein the distance between two opposed resilient tongues of the first retaining spring is different from the distance between two opposed resilient tongues of the second retaining spring, to thereby safeguard said first brake pad against clamping engagement on said recess of the external housing leg and said second brake pad against clamping engagement on said brake piston.

2. A set of brake pads as claimed in claim 1, wherein the distance between the two resilient tongues of the first retaining spring is smaller than the distance between the two resilient tongues of the second retaining spring.

3. A set of brake pads as claimed in claim 1, wherein the two resilient tongues of both retaining springs in relation to the axis of the brake piston are arranged opposite each other at an angle of 180°, and in that a third resilient tongue is respectively arranged at an angle of 90° in relation to the other two resilient tongues.

4. A set of brake pads as claimed in claim 3, wherein the portion of the third resilient tongue which abuts on the brake piston or on the external housing leg generally has the same distance to the axis of the brake piston as the other two resilient tongues.

5. A set of brake pads as claimed in claim 3, wherein any one of the preceding claims, the retaining springs have an identical design, with the exception of the distances between the resilient tongues.

6. A set of brake pads as claimed in claim 1, wherein any one of the preceding claims, the distance between the resilient tongues of the first retaining spring differs from the distance between the resilient tongues of the second retaining spring by 10%.

7. A floating-caliper disc brake assembly, comprising:

a first brake pad with a first friction lining, a second brake pad with a second friction lining, said first friction lining and said second friction lining being of different shape, and a floating caliper having a hollow brake piston with a bore for engagement of a first retaining spring of said first brake pad and an external housing leg with a recess for engagement of a second retaining spring of said second brake pad, wherein the bore of the brake piston has a width that is conformed to the first retaining spring and is different from the width of the recess in the external housing leg that is conformed to the second retaining spring, whereby misapplication of said first brake pad on said external housing leg and said second brake pad on said brake piston is safeguarded against.

8. A disc brake as claimed in claim 7, wherein the bore of the brake piston is narrower than the recess of the external housing leg.

9. A disc brake as claimed in claim 7, wherein the recess of the external housing leg has the shape of part of a circle, and the diameter of the recess is larger than the diameter of the bore in the brake piston.

10. A disc brake as claimed in claim 9, wherein the diameters of the recesses of and the diameter of the bore in the brake piston differ by roughly 10%.

* * * * *